United States Patent [19]

Noda et al.

[11] Patent Number: 5,107,102

[45] Date of Patent: Apr. 21, 1992

[54] ARRANGEMENT FOR DETECTING A SIGNAL FOR EFFECTING A FOCUS CONTROL OF AN OPTICAL HEAD

[75] Inventors: Kazuo Noda, Yokohama; Koichi Yamazaki, Sakado; Eiichi Nakamura, Sagamihara; Tetsuya Honda, Shiki, all of Japan

[73] Assignee: Nippon Conlux Co., Ltd., Tokyo, Japan

[21] Appl. No.: 646,145

[22] Filed: Jan. 25, 1991

Related U.S. Application Data

[62] Division of Ser. No. 169,399, Mar. 17, 1988, abandoned.

[30] Foreign Application Priority Data

Apr. 15, 1987 [JP] Japan ................. 62-92495

[51] Int. Cl.$^5$ .................................. G01J 1/20
[52] U.S. Cl. ................. 250/201.5; 369/44.41
[58] Field of Search ............. 250/201.5; 369/44.41, 369/44.32

[56] References Cited

U.S. PATENT DOCUMENTS

| | | | |
|---|---|---|---|
| 4,152,586 | 5/1979 | Elliott et al. | 250/201.5 |
| 4,381,557 | 4/1983 | Jebens | 250/201.5 |
| 4,633,454 | 12/1986 | Tsukai | 250/201.5 |
| 4,724,533 | 2/1988 | Okara et al. | 250/201.5 |
| 4,742,218 | 5/1988 | Nakamura et al. | 250/201.5 |
| 4,764,912 | 8/1988 | Ando et al. | 250/201.5 |
| 4,847,480 | 7/1989 | Maeda et al. | 250/201.5 |

FOREIGN PATENT DOCUMENTS 0059630 3/1986 Japan .................. 369/44.41

Primary Examiner—David C. Nelms
Assistant Examiner—Michael Messinger
Attorney, Agent, or Firm—Koda and Androlia

[57] ABSTRACT

This device is an arrangement for detecting a signal for effecting a focus control of an optical head with respect to an optical information recording medium by making use of a reflected light beam from the optical information recording medium. On an optical path for a reflected light beam reflected from the recording surface of the optical recording medium, a photodetector is provided. This photodetector is composed of a plurality of elements arranged symmetrically in the transverse cross section of the light beam. Thus, an output of the outside element and an output of the inside element of the plural elements arranged in the transverse cross section of the light beam are used to detect a focus error, thus to utilize the signal detected for the focus control.

2 Claims, 2 Drawing Sheets

ARRANGEMENT FOR DETECTING A SIGNAL FOR EFFECTING A FOCUS CONTROL OF AN OPTICAL HEAD

This is a division of application Ser. No. 169,399, filed Mar. 17, 1988 now abandoned.

BACKGROUND OF THE INVENTION

1. Field of the Art

This invention relates to an arrangement for detecting a focus control signal in an optical head for recording information onto information recording medium, e.g., an optical card, or an optical disk, etc. and reproducing the same therefrom.

2. Prior Art

When information is recorded and/or reproduced using an optical head, a light beam is focused using a focusing lens while moving or rotating information recording medium (which will be simply referred to as "medium" hereinafter) in a plane direction, to thereby focus on the medium, thus to irradiate the light beam onto the medium.

In this instance, when the medium is moved or rotated, vertical plane vibrations are produced on the medium surface due to the curvature or warp of the medium itself, mechanical error of the moving/rotating mechanism, or the like.

Such plane vibrations ordinarily have an amplitude of approximately 100 microns. On the other hand, since the depth of a focus of the focusing lens is a small value of approximately several microns, a large deviation or discrepancy of focus occurs at all times at the time of recording/reproducing of information, with the result that the information is impossible to record or reproduce.

To prevent such a deviation of the focus, optical heads of various configuration having an automatic focusing function have been conventionally provided. For instance, when information is recorded on an optical card and is reproduced therefrom, the arrangement shown in FIG. 6 is often used because of simple structure and excellent reproducing operation, etc.

For reproducing information recorded on an optical card using an optical head shown in FIG. 6, a projected light 2 from a light source 1, e.g., a light emitting diode or a laser diode, etc. is changed to light beams 4 through a collimating lens 3 to focus the light beams 4 using a focusing lens 5, thereafter to irradiate rays of a focused light 6 onto an optical card 7. Rays of a reflected light 8 from the optical card 7 are subjected to intensity change in accordance with the information recorded on the optical card 7 to change to beams 9 via the focusing lens 5. The beams 9 are reflected by a mirror 10 and are then converged by a lens 11, thus to reach a light receiving element 12, at which the optical intensity change is converted to a current change. Namely, the reproduction of the recorded information is conducted.

For allowing the optical head shown in FIG. 6 to have an automatic focusing function, a focus control signal must be detected. Such a detection is carried out by the method shown in FIG. 7.

FIG. 7 shows the case that the optical card 7 moves close to the focusing lens 5 to reach the position of the optical card $7_1$, or away from the focusing lens 5 to reach the position of the optical card $7_2$ by the plane vibration produced when the optical card 7 is moved in a plane direction, i.e., in directions indicated by an arrow 13 in order to reproduce the information recorded on the optical card 7.

In FIG. 7, where the optical beam 4 is focused via an optical path at the left of the focusing lens 5 and is then reflected by the optical card 7, the reflected light advances via an optical path at the right of the focusing lens 5 to change to the light beam 9, thus to reach the central portion of the light receiving element 12 via the mirror 10 and the lens 11. Further, where the light beam 4 is reflected at the position of the optical card $7_1$, the reflected light changes to a light beam $9_1$ to reach the portion below the light receiving element 12. In addition, where the light beam 4 is reflected at the position of the optical card $7_2$, it changes to a light beam $9_2$ to reach the portion above the light receiving element 12.

The light receiving element 12 has a configuration, for example, as shown in FIG. 8 such that it is divided into elements $12_1$ and $12_2$ by a divisional line $12_3$. These divisional elements $12_1$ and $12_2$ are arranged so that the light beam 9 is irradiated equally to the elements $12_1$ and $12_2$. Thus, the light beam $9_1$ is irradiated mainly to the element $12_1$ and the light beam $9_2$ is irradiated mainly to the element 12.

By applying electrical outputs $14_1$ and $14_2$ from the elements $12_1$ and $12_2$ to a differential amplifier 15, the focus control signal is taken out as an output 16 of the differential amplifier 15.

The focus control signal output 16 is obtained relatively with ease by using the above-mentioned method. However, this method has the drawback that even when the medium is located at the position in focus as indicated by the optical card 7 in FIG. 7, a focus control signal is erroneously produced if the medium has a tendency due to the inclination of the medium itself, curvature of the medium, or the like. Namely, this is because when the light beam 4 is reflected by an inclined optical card $7_3$ as shown in FIG. 9, it changes to a light beam $9_3$ to reach the portion below the light receiving element. Further, when the detection method in FIG. 8 is taken as an example, this is because light beams $9_1$, $9_2$ and $9_3$ move toward the bottom portion in the figure, i.e., in a direction indicated by an arrow 14, respectively. It is to be noted that when the optical card 7 is inclined in a direction opposite to the optical card $7_3$, the light beams $9_1$, $9_2$ and $9_3$ move in a direction opposite to the above.

As just described above, an interference focus control signal output produced by the inclination of the medium is superimposed on a normal focus control signal output produced by the plane vibration of the medium, whereby the focusing function is degraded, so that the information is impossible to record or reproduce.

SUMMARY OF THE INVENTION

This invention has been made in contemplation of solving the drawbacks with the prior art and its object is to provide means for excluding or cancelling an interference focus control signal output produced due to the inclination of the medium.

To achieve the above object, this invention provides an arrangement for detecting a signal for effecting a focus control of an optical head in which a photodetector divided into a plurality of elements along the radial direction of a reflected light beam from a medium is provided on an optical path for the reflected light beam, thus to obtain a signal based on an inclination of the medium when a reflected light beam is detected by an element disposed outside in a direction of the transverse cross section of the photodetector.

The photodetector is disposed on an optical path for the reflected light beam. Thus, when focus deviation of the reflected light beam exceeds a predetermined value, light is irradiated to the element disposed outside the transverse direction of the photodetector of the plural elements, or according as the focus deviation becomes large, more light is irradiated thereto. Thus, it can be detected that the focus deviation has been increased.

A large focus deviation occurs when the plane vibration has occurred on the medium. Thus, when it is detected that the focus deviation has been increased, the operation for effecting a focus control of the optical head is suppressed.

DETAILED DESCRIPTION OF PREFERRED EMBODIMENTS

Figure 1:
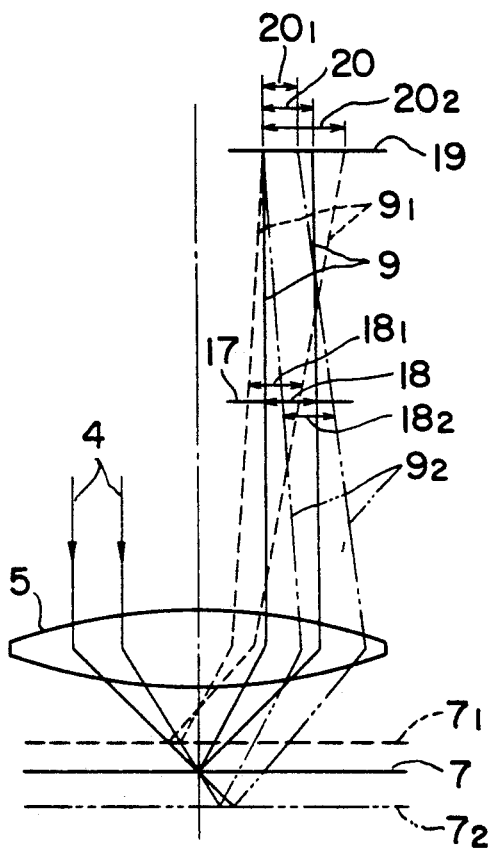
FIG. 1 is a diagrammatical view showing the advancing direction, and divergence and convergence of a reflected light beam from the medium.

FIG. 1 shows the advancing direction, and the divergence and convergence of reflected light beams 9, $9_1$ and $9_3$ from the optical cards $7_1$, $7_2$ and $7_3$ according to this invention. In FIG. 1, at the position 17 close to the focusing lens 5, the beam cross sectional diameter and the beam position of the reflected light beams 9, $9_2$ and $9_3$ are indicated by reference numerals 18, $18_2$ and $18_3$ wherein the beam cross sectional diameter has a relationship expressed as $18 > 18 > 18_2$ and the beam position is in order of $18_1$, 18 and $18_2$ from the left. On the other hand, at the position 19 away from the focusing lens 5, the beam cross sectional diameter and the position of reflected light beams 9, $9_2$ and $9_3$ are indicated by reference numerals 20, $20_1$ and $20_2$.

Figure 2:
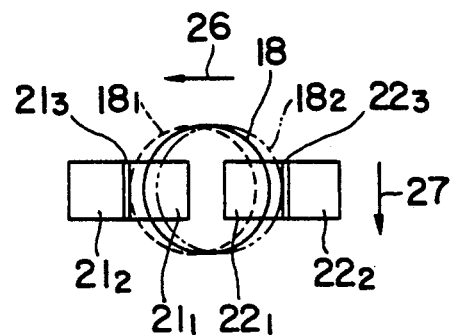
FIGS. 2 and 4 are schematic views showing an example of a relative configuration of a reflected light beam and a light receiving element applied to this invention.

FIG. 2 shows light beams 18, $18_1$ and $18_2$ at the position 17 on an optical path for a reflected beam of the optical system in FIG. 1. This is substantially equivalent to the relationship of the light beams 9, $9_1$ and $9_2$ in FIG. 8. At this position 17, the position of the entirety of light beams is shifted depending upon whether or not the light beam focuses on the surface of the medium.

Figure 8:
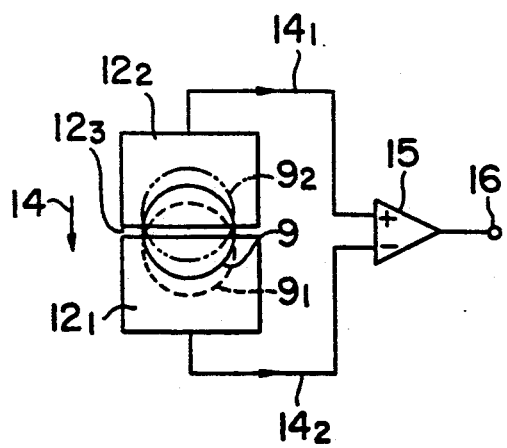

In the example conventionally known as shown in FIG. 8, as previously described, the light receiving element 12 is arranged as it being divided into elements $12_1$ and $12_2$. On the contrary, in the first embodiment of this invention, as shown in FIG. 2, the light receiving element is divided into four elements and thus elements $21_1$ and $21_2$, and $22_1$ and $22_2$ are arranged as shown.

Namely, the elements $21_1$ and $21_2$ are arranged in a manner that the divisional line $21_3$ is in contact with the outer periphery of the light beam $18_1$, and the elements $22_1$ and $22_2$ are arranged in a manner that the divisional line $22_3$ is in contact with the outer periphery of the light beam $18_2$.

Figure 3:
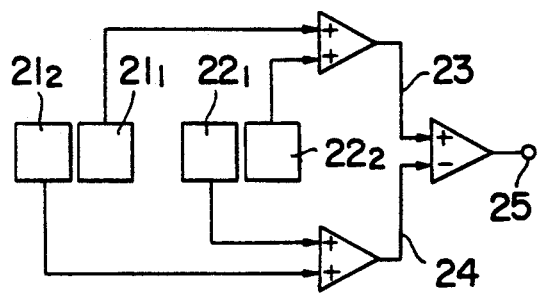
FIGS. 3 and 5 are block diagrams showing a circuit for synthesizing light receiving element outputs applied to this invention.

A light receiving element output 25 is obtained, as shown in FIG. 3, by obtaining a difference between an output 23 indicative of the sum of outputs of elements $21_1$ and $22_2$ and an output indicative of the sum of outputs of elements $21_2$ and $22_1$. With the circuit thus constituted, a focus control signal when the optical card 7 moves to the position of $7_1$ or $7_2$, i.e., when the optical card 7 moves from the position in focus to the position out of focus and thus the light beam 18 changes to $18_1$ or $18_2$, is obtained from the elements $21_1$ and $22_1$. This is equivalent to the operation of the elements $12_1$ and $12_2$ in FIG. 8.

Further, when the optical card 7 is inclined and thus optical cards 18, $18_1$ and $18_2$ move in a direction, e.g., indicated by an arrow 26, light initiates being irradiated to the element $21_2$, but light irradiated to the element $22_1$ is decreased at the same time. Thus, a change in the output of the element $21_2$ and a change in the output of the element $22_1$ cancel each other, so that the light receiving element output 25 changes little, thus being kept substantially constant. Moreover, also when the optical card 7 is inclined in an opposite direction and thus the optical beams 18, $18_1$ and $18_2$ move in a direction opposite to the direction indicated by the arrow 26, a change in the output of the element $22_2$ and a change in the output of the element $21_1$ cancel each other, so that the light receiving output 25 is substantially kept constant.

In addition, when the optical card 7 is inclined in a direction perpendicular to the above-mentioned direction, the light beams 18, $18_1$ and $18_2$ move, e.g., in a direction indicated by an arrow 27. In this case and also another case when the optical card 7 is inclined in an opposite direction and thus the light beams 18, $18_1$ and $18_2$ move in a direction opposite to the direction indicated by the arrow 27, the light receiving element output 25 changes little.

Accordingly, in accordance with the circuit arrangement in FIG. 3, only a focus control signal when the optical card 7 moves from the position in focus to the position out of focus is obtained as a light receiving element 25, but a measure can be taken such that an interference focus control signal produced when the optical card 7 is inclined does not appear on the light receiving output 25.

Figure 4:
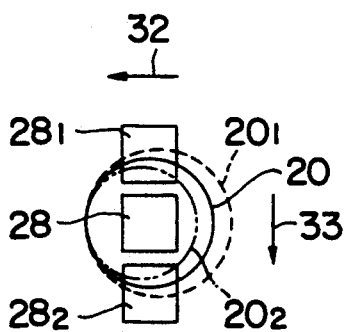

FIG. 4 shows light beams 20, $20_1$ and $20_2$ at the position 19 on the optical path for a reflected light beam of the optical system in FIG. 1. At this position 19, particularly the magnitude of the beam varies in dependence upon whether or not the light beam focuses on the surface of the medium. In this case, the magnitude of the beam changes with a point on the outer peripheral edge of the beam being fixed.

In the example shown in FIG. 4, the light receiving element 12 is divided into three elements 28, $28_1$ and $28_2$. These elements 28, $28_1$ and $28_2$ are arranged so that light beams 20, $20_1$ and $20_2$ are irradiated to the element 18, the light beam 20 is irradiated to one half of the area of the elements $28_1$ and $28_2$, the light beam $20_1$ is irradiated to an area larger than one half of the area of the elements $28_1$ and $28_2$, and the light beam $20_2$ is irradiated to an area smaller than one half of the area thereof.

Figure 5:
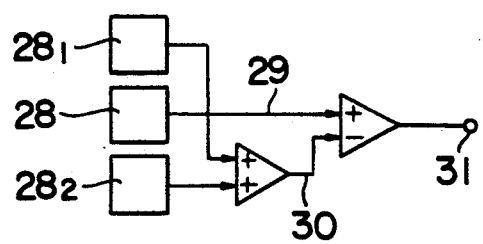

By making use of the circuit configuration in FIG. 5, a light receiving element output 31 is obtained by obtaining a difference between an output 29 of the element 28 and an output 30 indicative of the sum of outputs of the elements $28_1$ and $28_2$. With circuit thus constituted, when the optical card 7 moves to the position indicated by $7_1$ or $7_2$, the light beam 20 changes to $20_1$ or $20_2$. Thus, the diameter of the beam changes.

For this reason, the output of the element 28 decreases or increases whereas the outputs of the elements $28_1$ and $28_2$ increase or decrease. Thus, a focus control signal is obtained from the light receiving element output 31. When the optical card 7 is inclined and thus the optical beams 20, $20_1$ and $20_2$ move, e.g., in a direction indicated by an arrow 32, the output of the element 28 does not change and the outputs of the elements $28_1$ and $28_2$ change also little because the light beams 20, $20_1$ and $20_2$ move in an outer peripheral tangential direction. As a result, the light receiving element output 31 is kept substantially constant. In addition, also when the optical card 7 is inclined in an opposite direction and thus the light beams 20, $20_1$ and $20_2$ move in a direction opposite to the direction indicated by the arrow 32, the light receiving element output 31 is kept substantially constant in the same manner as stated above.

Further, when the optical card 7 is inclined in a direction perpendicular to the above-mentioned direction, the light beams 20, $20_1$ and $20_2$ move, e.g., in a direction indicated by an arrow 33. In this case, the output of the element 28 does not change, and the output of the element $28_1$ decreases, but the output of the element $28_2$ increases. Thus, a change in the output of the element $28_1$ and a change in the output of the element $38_2$ cancel each other. As a result, the light receiving element output 31 changes little, thus being kept substantially constant. In addition, also when the optical card 7 is inclined in an opposite direction and thus the light beams 20, $20_1$ and $20_2$ move in a direction opposite to the direction indicated by the arrow 33, a change in the output of the element $28_1$ and a change in the output of the element $28_2$ cancel each other, so that the light receiving element output 31 is kept substantially constant.

Figure 6:
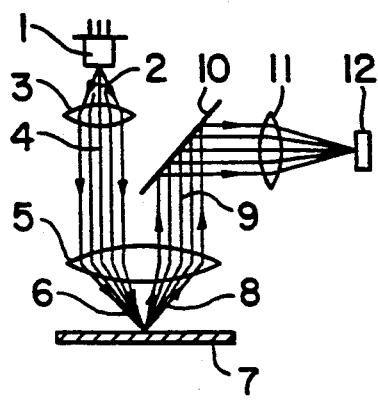
FIG. 6 is a diagrammatical view for explanation of the operation when recorded information on the optical card is reproduced using an optical head.
Figure 7:
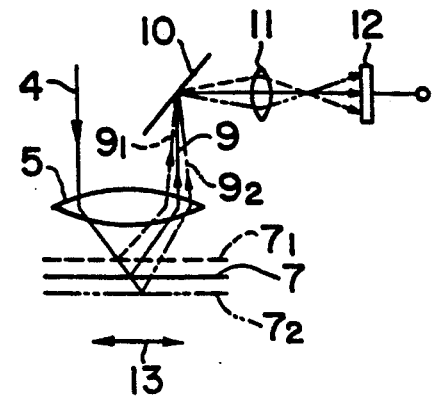
FIGS. 7 and 8 are schematic views for explaining a method of detecting a focus control signal.
Figure 9:
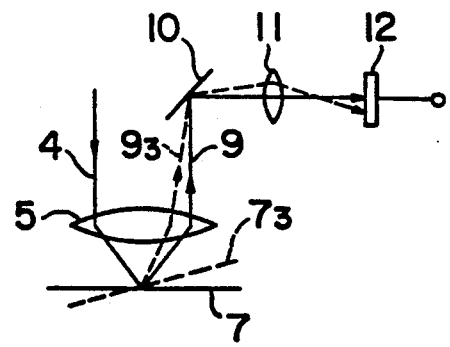
FIG. 9 is a diagrammatical view for explaining that an interference focus control signal is produced due to the inclination of the medium.

While reference is not made to the mirror 10 and the lens 11 shown in FIGS. 6, 7 and 9 in the above description of this invention, they may be used according to need. Even when used, the same advantages with the above-mentioned embodiment of this invention can be obtained.

While an explanation has been made by taking an example of an optical card in the above-mentioned embodiments, it is needless to say that this invention is applicable not only to the optical card but to the optical disk or the like.

While an explanation has been made in connection with the case that the light receiving element 12 is divided into four elements and three elements, the shape of respective divisional elements, and how to provide divisional lines, etc. may be suitably changed. For example, in the case of three divisional elements, a method may be employed to use two sets of two divisional elements to provide three divisional configuration by connecting respective sets in parallel. Namely, when the embodiment in FIG. 8 is taken as an example, the light receiving elements $21_1$ and $22_1$ may be connected in parallel to provide a three divisional configuration. Further, it is not necessarily required that light receiving elements are arranged in a direction parallel or perpendicular to the moving direction of the light beam as shown in FIG. 2 or FIG. 4. They may be arranged with a predetermined angle. Namely, while the light receiving elements $22_2$, $22_1$, $21_1$ and $21_2$ are arranged in a direction parallel to the arrow 26 in order recited in FIG. 2, these light receiving elements $22_2$, $22_1$, $21_1$ and $21_2$ may be arranged with a suitable angle with respect to the direction indicated by the arrow 26. In addition, while the light receiving elements $28_1$, 28 and $28_2$ are arranged in a direction parallel to the direction indicated by the arrow 33 in order recited in FIG. 4, these light receiving elements $28_1$, 28 and $28_2$ may be arranged with a suitable angle with respect to the direction indicated by the arrow 33.

As described above, in accordance with this invention, when information is recorded and/or reproduced using an optical head, an arrangement can be provided such that a normal focus control signal when the medium moves from the position in focus to the position out of focus can be detected, but interference focus control signals when the medium is inclined cancel each other, thus allowing such signals not to appear on the output. Thus, the arrangement according to this invention is effective in an improvement of the automatic focusing characteristic.

What is claimed is:

1. An arrangement for detecting a signal for effecting a focus control of an optical head comprising:
   an optical system for taking out a reflected light beam from an optical information medium;
   a photodetector having a plurality of rectangular elements aligned linearly and symmetrically along a line in a transverse section of said beam on an optical path for said beam; and
   a circuit for forming a focus error control signal by making use of an output of an element arranged outside of said transverse section in said photodetector and an output of the element arranged inside thereof, wherein said elements constituting said photodetector are arranged at positions where the position of said beam does not effectively change and the magnitude of said beam changes.

2. An arrangement of claim 1, wherein one of said plurality of rectangular elements is disposed in a central portion of said beam, and another one of said plurality of rectangular elements is disposed at an outer edge portion thereof whereby a focus control signal is taken out on the basis of a difference between an output of said element disposed in said central portion and an output of said element disposed in said outer edge portion.

* * * * *